Dec. 2, 1969   R. C. McKINLAY   3,481,119
AIR CLEANER CONSTRUCTION
Filed May 31, 1968
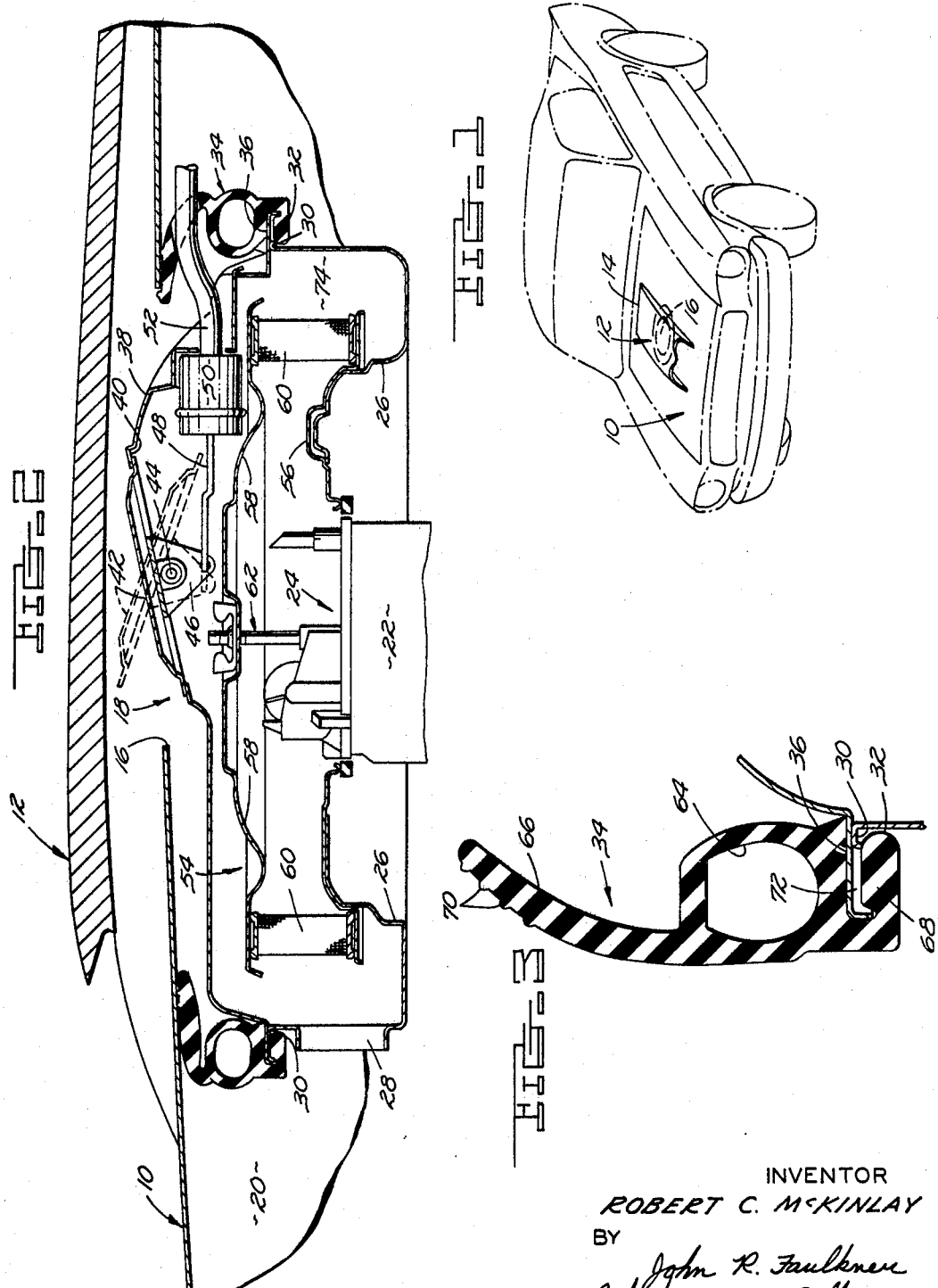
INVENTOR
*ROBERT C. McKINLAY*
BY
*John R. Faulkner*
*Robert E. McCollum*
ATTORNEYS

# United States Patent Office 3,481,119
Patented Dec. 2, 1969

3,481,119
AIR CLEANER CONSTRUCTION
Robert C. McKinlay, Dearborn, Mich., assignor to Ford Motor Company, Dearborn, Mich., a corporation of Delaware
Filed May 31, 1968, Ser. No. 733,457
Int. Cl. B01d 50/00
U.S. Cl. 55—419                5 Claims

ABSTRACT OF THE DISCLOSURE

An engine air cleaner has an outer housing having an inlet from the engine compartment and a second inlet connected to outside ambient air; the second inlet is opened and closed selectively to control the total air supply and density of the air; both inlets supply air to a manifold in which is located a sub-assembly containing a filter and which forces air to flow through the filter passage into the engine.

---

This invention relates, in general, to a motor vehicle type internal combustion engine. More particularly, it relates to an engine air cleaner construction that provides a supply of clean filtered air at varying densities to a motor vehicle engine, the density varying selectively in response to selected changes in engine operating conditions.

The total air flow through an engine air cleaner will vary as a function, for example, of the frictional resistance and drag on the air as it passes through the radiator and other parts of the intake system, the restriction caused by the size of the inlet to the air cleaner, the porosity of the filter element therein, and the various bends in the path of the flow resulting from the specific construction of the air cleaner per se.

Prior art devices are known in which, during low load and cold operating conditions of the engine, a restricted, heated air supply is provided to the engine, the air flow, however, being sufficient to satisfy engine requirements at this time. For performance, the latter devices provide an additional duct that opens to admit a less restricted volume of air from the engine compartment of the vehicle that subsequently combines with an increased flow of fuel into the carburetor. These latter prior art systems, however, are not completely satisfactory since the air in both cases, if it is warm, is essentially the same in density, thereby limiting the overall flow of air by weight into the carburetor.

The invention relates to an engine air cleaner construction providing two sources of clean filtered air for the carburetor of an engine, one of which supplies denser, cooler air from outside the vehicle to permit a greater combination by weight of fuel and air passing into the engine.

More specifically, the invention provides an engine air cleaner cooperating with an opening in the hood of a motor vehicle for intermittently supplying denser, outside air to the engine when engine performance requirements so dictate; and, during low load engine operating conditions, the carburetor is supplied in the normal manner with less dense air from the vehicle engine compartment.

It is an object of the invention, therefore, to provide an engine air cleaner construction providing separate sources of clean filtered air selectively admitted to the engine as a function of the operating conditions of the engine.

It is another object of the invention to provide an engine air cleaner construction consisting of an outer housing having separated first and second air inlets communicating with an annular manifold containing an inner filter supporting subassembly through which all the air must pass prior to entry into the engine, the second inlet, however, being controlled by a semi-automatically operated valve means.

Other objects, features and advantages of the invention will became more apparent upon reference to the succeeding detailed description thereof, and to the drawings illustrating a preferred embodiment thereof, wherein:

FIGURE 1 illustrates, isometrically, a motor vehicle shown in phantom lines, having an engine air supply system embodying the invention;

FIGURE 2 shows a cross-sectional view of an engine air supply system embodying the invention; and FIGURE 3 is an enlarged cross-sectional view of a detail in FIGURE 2 in a different operative position.

Many motor vehicles in operation today have an engine air supply system that includes an air cleaner located in the engine compartment of the vehicle over the inlet to the carburetor, the air cleaner having a single air inlet communicating directly with the air in the engine compartment. This air is inducted through a radiator, into the air cleaner inlet, and then past a filter so as to provide a scheduled quantity of clean air into the engine to satisfy all operating conditions thereof. However, it will be clear that an air supply system of this type is not fully satisfactory for all operating conditions of the engine as a result of the large restriction to flow at the different engine speeds. The conventional air cleaner construction, therefore, is a compromise as a result of a need for designing it so as to satisfy fuel vapor emission control requirements, economical fuel consumption requirements, and yet provide the necessary performance to the engine when required.

The conventional air cleaner assembly generally has either a single air inlet snorkel, or an annulus, receiving engine compartment air at the temperature thereof, and, also, therefore, the density; or, alternately, a split intake system in which cool air first either is warmed by a shroud around the exhaust manifold before being inducted into the air cleaner, at low ambient temperatures, or if the air is sufficiently warmed, is taken directly into the air cleaner and the heated air supply shut off. It will be clear that with the latter system, air at essentially a fixed density is used to satisfy essentially all the flow requirements of the engine. In the former case, the intially cooler air does not satisfy exhaust emission requirements and is uneconomical insofar as fuel consumption is concerned.

It will be clear that, with a conventional downdraft type carburetor, performance of an engine is controlled not only by the total air flow passing through the carburetor, but also by the weight of the air; it will also be clear that if only warm engine compartment air is used as the air source, not as much will combine with fuel for a fixed volume to provide the burnable mixture as would a denser air. It will be equally clear that, during performance demands, if a cooler, denser supply of air be admitted to the carburetor inlet, more fuel can be combined with the air resulting in greater output performance of the engine.

The invention provides the selective operation of an air supply system as described above to supply the engine with engine compartment air to satisfy normal load requirements of the engine, while automatically supplying a denser flow and greater volume of air into the carburetor when engine performance and greater output are called for.

More specifically, FIGURE 1 shows in phantom lines a motor vehicle including a hood 10. The hood has an air scoop or shroud 12 secured thereon and consists essentially of an inverted channel member closed at the back portion 14. Directly beneath scoops 12 is an opening 16 in hood 10 for the passage of outside air directly into the engine air cleaner, in a manner to be described.

As best seen in FIGURE 2, an air cleaner assembly 18 is positioned directly beneath and cooperating with opening 16 in hood 10. The assembly automatically operates, in a manner to be described, to supply air to the engine either from the engine compartment 20 alone, or from both the compartment 20 and the outside ram air admitted through scoop 12 and opening 16.

The motor vehicle engine (not shown) in this case has a known type of downdraft carburetor indicated in general at 22. It includes an air horn assembly 24 providing an air duct of a predetermined size for the flow of air into the carburetor and intake manifold of the engine. The hollow sheet metal housing of the air cleaner assembly 18, as shown, is sealingly mounted on and secured to air horn 24.

The air cleaner housing includes an essentially half doughnut shaped or annular like lower portion 26 that, at its leftward side, has a tubular like opening 28 for the admission of air from engine compartment 20. The upper outer periphery has an annular rolled or beaded edge 30 that sealingly engages the rounded edge 32 of a grooved portion of an annular rubber sealing boot 34. The edge 30 also engages the underside of an annular flange 36 that extends laterally from the air cleaner cover or upper housing portion 38 also into sealing engagement with boot 34.

Housing cover portion 38 has an inverted bowl shape with an enlarged central hump like portion that includes an annular opening 40. The opening is opened and closed by the pivotal movement of a flap door that constitutes a butterfly type valve 42. The latter has a balanced central pivotal mount on a shaft 44 fixed between the sides of the outer housing portion member. Valve member 42 has a depending bracket 46 pivotally connected to a linear movable rod 48 of a known type of vacuum servo motor device 50. The latter is mounted to cover 38, and would contain a diaphragm secured to rod 48 and moved by spring pressure in one direction and in the opposite direction by vacuum in a tube 52. In this case, tube 52 is adapted to be connected to the intake manifold of the engine so as to be subject to the changes in vacuum therein to vary the opening and closing movements of flap valve 42.

The spring in servo motor 50, in the absence of vacuum in tube 52, will move rod 48 leftwardly to pivot flap door 42 clockwise. This will connect the openings 40 and 16 to admit dense ram air in hood scoop 12 to the air cleaner. When the vacuum in the intake manifold is high, as during low load conditions of operation of the engine, or at engine idle, the vacuum will overcome the spring force and maintain the flap door 42 in the full line, closed position shown.

Continuing with the description of the air cleaner assembly, a sub-assembly 54 is nested over the lower pan portion 26, and consists of a thin lower washer-like portion 56 and a thin upper disc-like secondary cover portion 58. Portion 56 overlies and engages pan portion 26, and is radially separated from cover 58 by an annular filter element 60. The latter can be of any known suitable construction, such as, for example, a pleated paper element. The sub-assembly is fixedly mounted to the carburetor air horn 24 by a bail and wing nut attachment 62.

FIGURE 3 illustrates more clearly a section of the annular boot or hood seal 34. It has a cored central section 64 to increase the flexibility, a pliable sealing annular lip portion 66, and an annular lip portion 68. The lip portion 66 has a number of annular ridges 70 providing a labyrinthian seal (FIGURE 2) to minimize leakage of air between engine compartment 20 and air scoop passage 12. The lip portion 68 is defined by an annular groove 72 in which are seated the flange 36 and beaded edge 30.

FIGURE 2 shows the boot in installed position compressed so as to elastically force ridges 70 against the underside of hood 10 in a sealing manner.

OPERATION

The operation of the invention is believed to be clear from the above description and from a consideration of the drawings. In brief, however, when the engine is operating at low load conditions, such as during idling or part throttle, the level of the vacuum in the intake manifold of the engine will be high enough to overcome the force of the spring (not shown) in vacuum motor 50 and position the flap door 42 in the closed position shown preventing the entrance of cooler denser outside air into the air cleaner assembly. Accordingly, during these times, all of the air introduced into the engine will pass through the vehicle radiator and into the engine compartment and therefrom into air inlet 28 to flow around annular compartment 74 and pass radially through filter element 60 into the inlet in air horn 24 and therefrom into the carburetor proper. At this time, therefore, relatively warm air of essentially fixed density will be combined with the fuel in the carburetor to provide the engine operation called for.

When acceleration is demanded, such as by an essentially full or nearly full depression of the vehicle accelerator pedal, a sudden wider opening of the throttle valve will decay the engine intake manifold vacuum to a low value, thereby permitting the force of the spring in vacuum motor 50 to push rod 48 to the left and pivot flap door 42 clockwise to its wide open position indicated in dotted lines. It will be clear that in this position the door will be substantially aligned with the direction of flow of ram air passing through the hood scoop 12, and therefore, that resistance to flow offered by the door 42 is minimized.

Accordingly, a large supply of ram air that is both cooler and denser than the air in engine compartment 20 will flow through the openings 16 and 40 into the annular space or manifold 74, and will pass radially through filter element 60 and into the inlet to the carburetor. Accordingly, the air being of greater volume (less restriction to flow) and denser than that conventionally taken into the engine compartment air inlet 28, a greater quantity of fuel can be combined with the air at this time so as to provide a greater output performance of the engine.

From the foregoing, it will be seen that the invention provides an engine air cleaner construction, which, during normal operation of the engine supplies all of the air to the engine from the vehicle engine compartment; and, that a supplemental cooler, denser and greater volume of ram air from outside the vehicle is added when the situation demands to permit the burning of a greater volume of fuel and thereby provide a greater output performance.

I claim:

1. A dual air inlet air cleaner assembly comprising in combination, a hollow housing having disc-like axially spaced top and bottom portions joined adjacent their outer peripheries by a cylindrical-like axially extending portion having a continuously open air inlet opening therein, a disc-like partition member concentrically disposed within said housing axially spaced from said top and bottom portions and radially spaced from said side portion dividing said housing into a pair of air chambers interconnected adjacent their outer peripheries by a toroidal-like space between the side portion and outer terminus of said partition member, an annular air filter element located in the axial space between the outer end of said partition and the bottom portion in a manner such that all air flowing into one of said chambers passes through said filter, said top portion having an opening therein constituting a second air inlet for the flow of air therethrough into said other chamber and through said toroidal-like space and past said filter element into said one chamber for a supply of filtered air to said one chamber concurrent with the flow of air through said side air inlet, valve means pivotally mounted across said second inlet opening for pivotal movement between positions opening and closing said second inlet, and selectively operable force means connected to said valve means for controlling the flow of air through said second inlet by the selective control of movement of said valve means.

2. An air cleaner assembly as in claim 1, said valve means comprising an essentially balanced centrally mounted butterfly type valve.

3. An air cleaner assembly as in claim 1, said top plate being inclined to form a guide member to guide the flow of air past said valve means into said second inlet when said valve means is open.

4. An air cleaner assembly as in claim 1, said filter element having an essentially vertically disposed axis for the flow of air through said filter into the interior thereof in essentially a radial direction.

5. An air cleaner as in claim 3, said valve means comprising a balanced butterfly type valve when opened having a streamlined cross-section minimizing restriction to flow of air therepast into said second inlet.

References Cited

UNITED STATES PATENTS

| | | |
|---|---|---|
| 1,448,008 | 3/1923 | Smith. |
| 1,912,657 | 6/1933 | Quam _____ 55—419 X |
| 1,743,521 | 1/1930 | Bull _____ 55—420 X |
| 2,058,204 | 10/1936 | Ball et al. |
| 2,084,991 | 6/1937 | Callahan. |
| 2,398,094 | 4/1946 | Heymann. |
| 2,430,759 | 11/1947 | Crise _____ 237—2 |
| 2,701,024 | 2/1955 | Thomas. |
| 2,788,086 | 4/1957 | Sebok _____ 55—419 X |
| 2,808,893 | 10/1957 | Dorman et al. _____ 180—54 |
| 2,822,794 | 2/1958 | Stearns. |
| 2,834,419 | 5/1958 | Sebok _____ 180—54 |
| 2,894,442 | 7/1959 | Hamilton. |
| 3,110,517 | 11/1963 | Olson et al. _____ 230—4 X |
| 3,249,172 | 5/1966 | De Lorean _____ 55—510 X |

FOREIGN PATENTS

| | | |
|---|---|---|
| 178,553 | 5/1954 | Austria. |
| 1,176,009 | 11/1958 | France. |
| 816,388 | 7/1959 | Great Britain. |
| 857,255 | 12/1960 | Great Britain. |

OTHER REFERENCES

Coles et al.: Icing-Protection Requirement for Reciprocating-Engine Induction Systems, National Advisory Committee for Aeronautics, Technical Note 1993, December 1949, pp. 3, 4, 11, 12, 35, and 36.

HARRY B. THORNTON, Primary Examiner

D. E. TALBERT, JR., Assistant Examiner

U.S. Cl. X.R.

48—180; 55—500, 502, 510; 123—119, 122; 137—87, 479, 485, 560; 180—54; 251—28, 58, 279, 305, 337